(12) United States Patent
Tsutsui

(10) Patent No.: US 8,265,054 B2
(45) Date of Patent: Sep. 11, 2012

(54) WIRELESS COMMUNICATION APPARATUS AND WIRELESS COMMUNICATING METHOD

(75) Inventor: Masafumi Tsutsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 277 days.

(21) Appl. No.: 12/613,002

(22) Filed: Nov. 5, 2009

(65) Prior Publication Data

US 2010/0046667 A1 Feb. 25, 2010

Related U.S. Application Data

(63) Continuation of application No. PCT/JP2007/060067, filed on May 16, 2007.

(51) Int. Cl.
H04B 7/216 (2006.01)
(52) U.S. Cl. ......... 370/342; 375/299; 375/267; 370/441
(58) Field of Classification Search .................. 370/342, 370/441; 375/299, 267
See application file for complete search history.

(56) References Cited

U.S. PATENT DOCUMENTS

| 7,058,425 | B1 | 6/2006 | Takakusaki | |
|---|---|---|---|---|
| 7,366,087 | B2 * | 4/2008 | Lee et al. | 370/203 |
| 7,539,253 | B2 * | 5/2009 | Li et al. | 375/260 |
| 2003/0185310 | A1 | 10/2003 | Ketchum et al. | |
| 2007/0064823 | A1 | 3/2007 | Hwang et al. | |
| 2007/0249296 | A1 * | 10/2007 | Howard et al. | 455/101 |

FOREIGN PATENT DOCUMENTS

| JP | 2001-185933 | 7/2001 |
|---|---|---|
| JP | 2005-522086 | 7/2005 |
| JP | 2005-237038 | 9/2005 |
| JP | 2005-311780 | 11/2005 |
| JP | 2006-352525 | 12/2006 |
| JP | 2007-028569 | 2/2007 |
| JP | 2007-089165 | 4/2007 |

OTHER PUBLICATIONS

Written Opinion of International Searching Authority for corresponding International Application No. PCT/JP2007/060067, with English Translation attached. Dated Aug. 28, 2007.
International Search Report for corresponding International Patent Application No. PCT/JP2007/060067, mailed Aug. 28, 2007.
The Institute of Electronics Information and Communication Engineers; "Eigenbeam-Space Division Multiplexing (E-SDM) in a MIMO Channel"; Technical Report of IEICE RCS2002-53 (May 2002) with English abstract.
Notice of Rejection issued for corresponding Japanese Patent Application No. 2009-513960 mailed May 22, 2012 with partial English translation.

* cited by examiner

*Primary Examiner* — Phuc Tran
(74) *Attorney, Agent, or Firm* — Myers Wolin, LLC

(57) ABSTRACT

A wireless communication apparatus of a base station uses antennas for multiple systems, forms a multi-beam, transmits data to a mobile station, and includes a code book configured to store therein beamforming information; a pre-coder that reads the code book and executes a process of forming a given beam for the data; a control unit that, based on feedback information to correct variations in phase occurring at transmitting circuits respectively corresponding to each of the systems, performs control such that the beamforming information to correct the variations in phase is read from the code book; and a phase correcting unit that corrects a phase of the multi-beam formed by the pre-coder, based on the feedback information and such that relations among the phases of the multi-beam become substantially linear.

10 Claims, 16 Drawing Sheets

15° STEPS

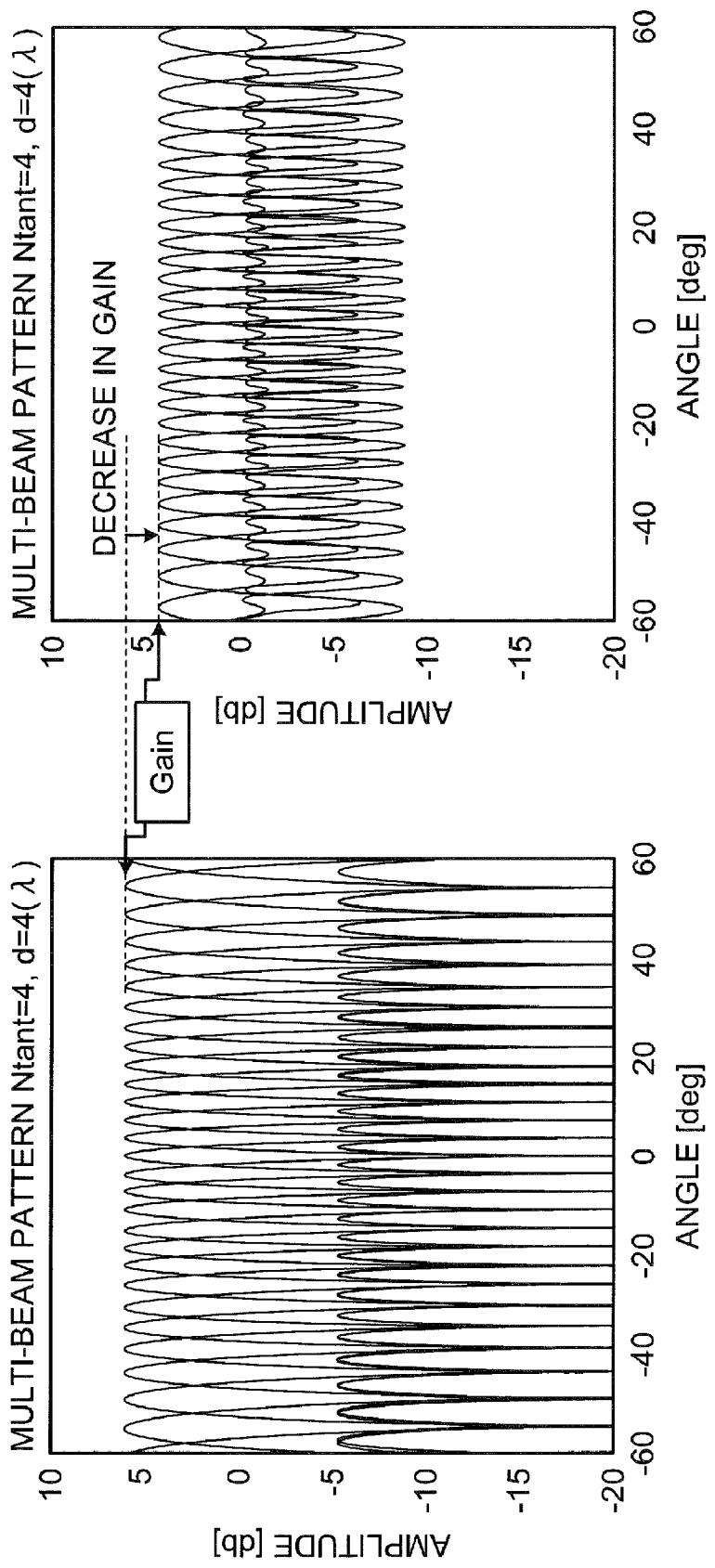

WIRELESS COMMUNICATION APPARATUS AND WIRELESS COMMUNICATING METHOD

CROSS-REFERENCE TO RELATED APPLICATIONS

This is a continuation of Application PCT/JP2007/060067, filed on May 16, 2007, now pending, the contents of which are herein wholly incorporated by reference.

FIELD

The embodiments discussed herein relate to a wireless communication apparatus and a wireless communicating method.

BACKGROUND

Conventionally, beamforming is a technique for transmitting and receiving data using multiple antennas. In the beamforming technique, data is transmitted through multiple antennas while phase shifting control is executed to achieve directionality using the multiple antennas.

Multiple input and multiple output (MIMO) is a technique of transmitting data that differs according to system (see, e.g., Japanese National Publication of International Patent Application No. 2005-522086).

FIG. 23 is a diagram of a wireless communication apparatus that executes pre-coding MIMO. FIG. 23 depicts a partial configuration of a wireless communication apparatus of a base station in a mobile communication system. Data of multiple systems (4 systems in FIG. 23) are input into a pre-coder 901 and the phases are adjusted by given amounts to form a multi-beam. A transmitting unit 902 includes transmitting circuits 902a to 902d for the systems and transmits the data through antennas 903.

However, in each of the transmitting circuits 902a to 902d, variations in phase occur with respect to each analog element, arising in a problem in that although the beams are appropriately set at the pre-coder 901, the setting is lost at the transmitting unit and directionality cannot be achieved.

FIG. 24 is an explanatory diagram of a decrease in gain during multi-beam transmission. As depicted in the left portion of FIG. 24, when variations in phase have not occurred, directionality is effected by a multi-beam and gain is improved (by 6 dB) for transmission. On the contrary, when variations in phase occur in the transmitting circuits 902a to 902d of the transmitting unit 902, directionality becomes inadequate, e.g., expansion occurs, and the gain of each beam decreases (by 4 dB).

A condition for maximum gain (6 dB) to be obtained is the absence of variations in phase, i.e., all the antennas are in the same phase. The direction of each multi-beam is further uniquely determined. To satisfy this condition, for example, when four antennas are used, since the phases are adjusted to be same as that of a reference antenna, the phases of three of the antennas are adjusted.

As a condition for the gain to be high (6 dB) without determining the direction of each multi-beam is for relations of the phases among the antennas to be disposed along a straight line. To satisfy this condition when four antennas are used, the phases of two of the antennas are adjusted. When any of the conditions is not satisfied, a decrease in gain of each beam depicted in FIG. 24 occurs. The degree of the decrease in gain is determined by the degree that the phases of the antennas deviate from the straight line.

Conventionally, to solve the problem of variations in phase, using an external calibrating apparatus (or an internal unit having such a function) and by a comparison of the output from the transmitting circuits 902a to 902d of the transmitting unit 902 with a reference signal, the phases are adjusted such that no variations in phase occur.

SUMMARY

According to an aspect of an embodiment, a wireless communication apparatus of a base station uses antennas for multiple systems, forms a multi-beam, transmits data to a mobile station, and includes a code book configured to store therein beamforming information; a pre-coder that reads the code book and executes a process of forming a given beam for the data; a control unit that, based on feedback information to correct variations in phase occurring at transmitting circuits respectively corresponding to each of the systems, performs control such that the beamforming information to correct the variations in phase is read from the code book; and a phase correcting unit that corrects a phase of the multi-beam formed by the pre-coder, based on the feedback information and such that relations among the phases of the multi-beam become substantially linear.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 24 is an explanatory diagram of a decrease in gain during multi-beam transmission.

DESCRIPTION OF EMBODIMENTS

Preferred embodiments of the present invention will be explained with reference to the accompanying drawings.

Figure 1:
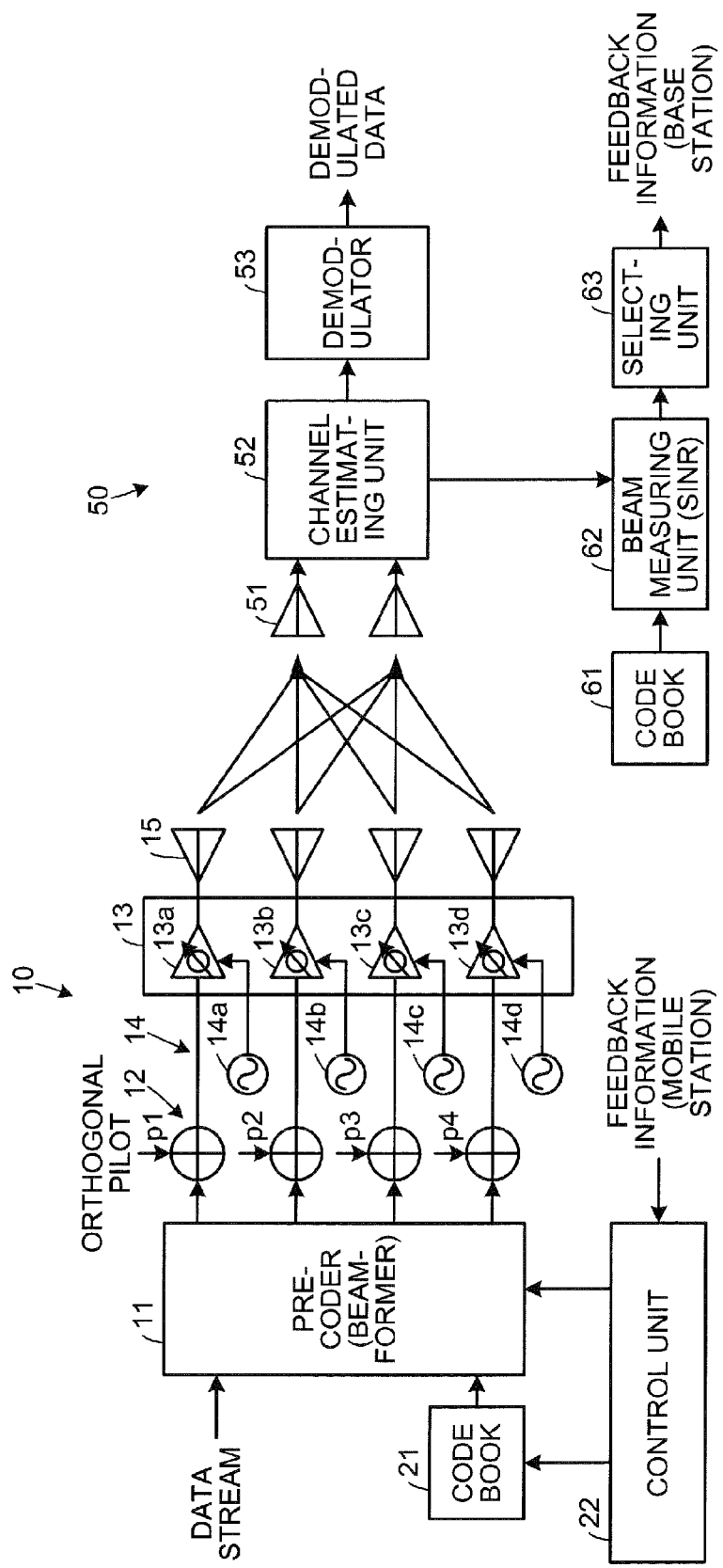
FIG. 1 is a diagram of a configuration of a wireless communication apparatus according to a first embodiment.

FIG. 1 is a diagram of a configuration of a wireless communication apparatus according to a first embodiment. FIG. 1 depicts a wireless communication apparatus 10 of a base station (transmitting side) and a wireless communication apparatus 50 of a mobile station (receiving side) in a mobile communication system.

Data (a data stream) for multiple systems (four systems in FIG. 1) is input into a pre-coder 11 and phase adjustments of given amounts are made for each of the systems to form a multi-beam. A code book 21 is configured to store therein 16 correction values (corresponding to the number of combinations of the systems), weights given to the data of each of the systems.

An adding unit 12 adds a pilot signal of a quadrature component (a quadrature pilot) to the data output for each system from the pre-coder 11. A transmitting unit 13 includes transmitting circuits 13a to 13d respectively for the systems, modulates the data at an oscillation frequency (RF) of an oscillator 14 (14a to 14d) for each system, and outputs the data through multiple antennas 15.

A control unit 22 executes a process of correcting variations in phase based on the data input from the wireless communication apparatus 50 of the mobile station, selects correction values to correct the variations in phase from the code book 21, and provides the correction values to the pre-coder 11.

The wireless communication apparatus 50 of the mobile station will be described. Concerning data received through antennas 51 for the systems (two systems in FIG. 1), a channel estimating unit 52 estimates a channel using the orthogonal pilot component in the transmitted data and a demodulator 53 demodulates the stream data and outputs the demodulated data. Although the system depicted in FIG. 1 is an exemplary configuration of four-input-two-output MIMO, other MIMO configurations may similarly be adopted.

The wireless communication apparatus 50 of the mobile station is also provided with a code book 61 storing therein the same content as that of the base station. Based on a channel estimation value estimated by the channel estimating unit 52 and the content of the code book 61, a beam measuring unit 62 calculates, for each beam, a channel estimation value for correcting deviations of the beams received. In this case, a beam with which SINR (SIR) becomes maximal is measured, and a selecting unit 63 selects an optimal transmission beam and an optimal number of streams and feeds back this information to the wireless communication apparatus 10 of the base station. The feedback information includes the transmission beam and the number of streams and may be easily transmitted to the base station without oppressing the band of the uplink transmission path. The beam measuring unit 62 and the selecting unit 63 constitute a control unit in the wireless communication apparatus 50 of the mobile station.

Figure 2:
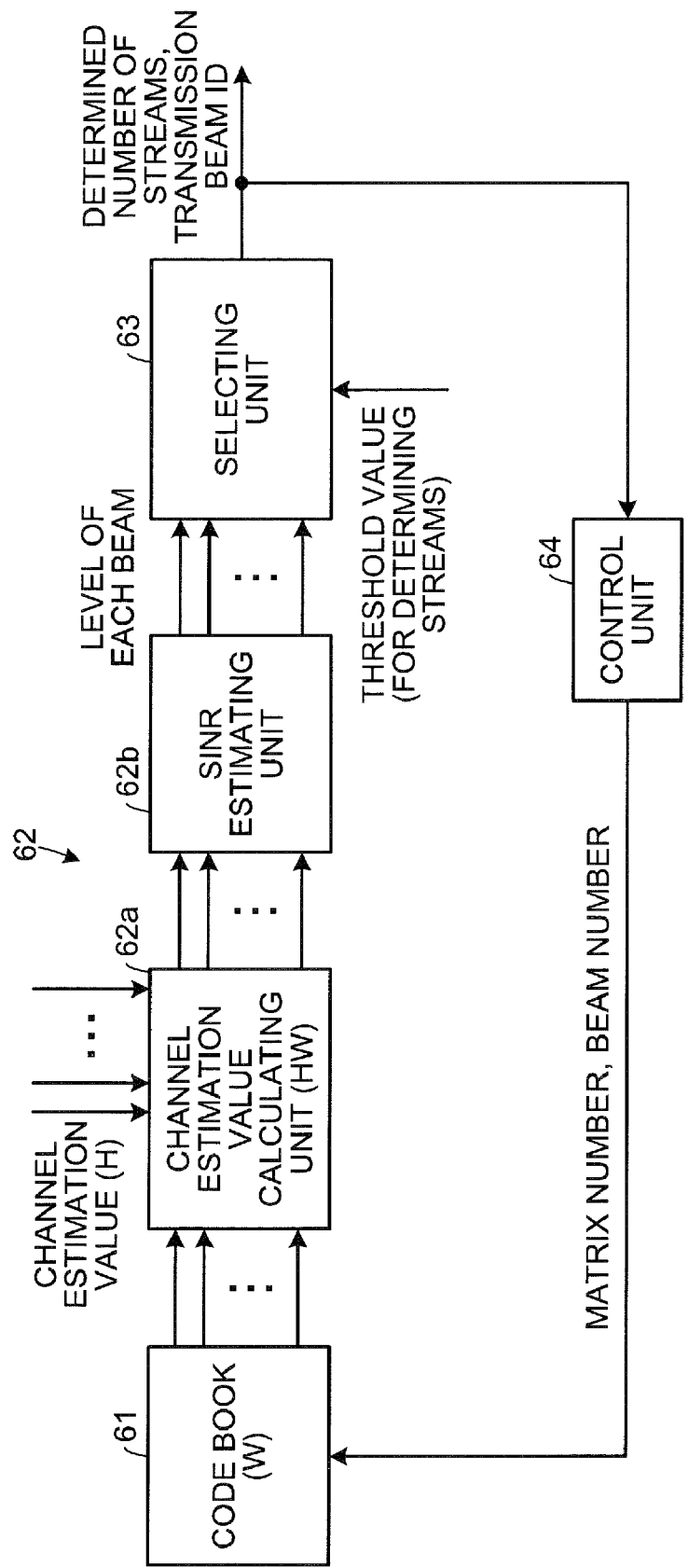
FIG. 2 is a diagram of a partial configuration of the wireless communication apparatus of the mobile station.

FIG. 2 is a diagram of a partial configuration of the wireless communication apparatus of the mobile station. FIG. 2 depicts a detailed configuration of the beam measuring unit 62 depicted in FIG. 1. The beam measuring unit 62 includes a channel estimation value calculating unit 62a and a SINR estimating unit 62b. The channel estimation value calculating unit 62a calculates a channel estimation value HW for each beam, based on a channel estimation value H output from the channel estimating unit 52 and a weight W set in the code book 61. The SINR estimating unit 62b estimates the level (SINR) of each beam using the channel estimation value HW of each beam. The SINR estimating unit 62b may also estimate the level using the SINR and signal power.

The selecting unit 63 compares a predetermined threshold value with the level of each beam and ranks the beams in descending order of level. The selecting unit 63 transmits, as feedback information to the wireless communication apparatus 10 of the base station, transmission beam IDs of the beams ranked highly and the number of streams.

A control unit 64 obtains the feedback information output from the selecting unit 63 and based on the obtained information, outputs to the code book 61, a matrix number and a beam number to be searched for. The code book 61 outputs to the channel estimation value calculating unit 62a, information concerning the matrix number and the beam number output from the control unit 64. Thereby, the mobile station searches the entire code book 61 or searches a portion of the code book 61.

In the code books 21 and 61 of the present embodiment, weights to execute formation of a beam format of the multi-beam and correction of the variations in phase are set. A weight W to generate a multi-beam is expressed in equation (1), ("j" and "–j" are imaginary numbers).

$$W = [w_1 \ w_2 \ w_3 \ w_4] = \frac{1}{2}\begin{bmatrix} 1 & 1 & 1 & 1 \\ 1 & -j & -1 & j \\ 1 & -1 & 1 & -1 \\ 1 & j & -1 & -j \end{bmatrix} = W(0, 0) \quad (1)$$

Concerning weight W, the following 16 combinations from W(0,0) to W(3,3) corresponding to the number of systems are set as information in a code book for pre-coding. W(0,0), W(0,1), W(0,2), W(0,3), W(1,0), W(1,1), W(1,2), W(1,3), W(2,0), W(2,1), W(2,2), W(2,3), W(3,0), W(3,1), W(3,2), W(3,3)

In the present embodiment, a code book to correct variations in phase of the transmitting circuits 13a to 13d of the transmitting unit 13 and obtain a high gain is generated. As described, in the case of four systems, represented as a 4×4 orthogonal matrix as D($m_3$, $m_4$), the matrix is expressed by equation (2) when the phase is shifted by 90° for each system. Virtual lines whose phases each differ by 90° are formed by setting two of four matrix elements disposed diagonally from the upper left to the lower right as "1" and "1". Terms to cause the relation of the phases to become close to the virtual straight line are $\phi(m_3)$ and $\phi(m_4)$.

$$D(m3, m4) = \begin{bmatrix} 1 & 0 & 0 & 0 \\ 0 & 1 & 0 & 0 \\ 0 & 0 & \phi(m3) & 0 \\ 0 & 0 & 0 & \phi(m4) \end{bmatrix}, \quad (2)$$

$$m3, m4 = 0, 1, 2, 3, \phi(m) = \exp\left(j\frac{\pi}{2}m\right)$$

The orthogonal matrix is normalized by applying Hermitian transpose after application of discrete Fourier transform (DFT) to the orthogonal matrix and thereby, equation (3) is calculated.

$$W(m_3,m_4) = \text{DFT}([D(m_3,m_4)])^H/\sqrt{4} \quad (3)$$

Where, H: Hermitian transpose

Hence, a unitary matrix for pre-coding is obtained and is set in each of the code books 21 and 61.

As a result, the state of the beam measuring unit 62 of the wireless communication apparatus 50 on the receiving side is a state expressed by equation (4) where, by using the code book 61, phase terms to correct variations in phase are added to a third and a fourth transmitting antennas.

$$W = [w_1 \; w_2 \; w_3 \; w_4] \quad (4)$$

$$= \frac{1}{2}\begin{bmatrix} 1 & 1 & 1 & 1 \\ 1 & -j & -1 & j \\ 1 \cdot \phi^*(m_3) & -1 \cdot \phi^*(m_3) & 1 \cdot \phi^*(m_3) & -1 \cdot \phi^*(m_3) \\ 1 \cdot \phi^*(m_4) & j \cdot \phi^*(m_4) & -1 \cdot \phi^*(m_4) & -j \cdot \phi^*(m_4) \end{bmatrix}$$

Where, *: complex conjugate

A beam number wi with which SINR becomes maximal and corresponding phase numbers (matrix numbers) $m_3$ and $m_4$ are obtained and transmitted to the wireless communication apparatus 10 of the base station as feedback information.

Figure 3:
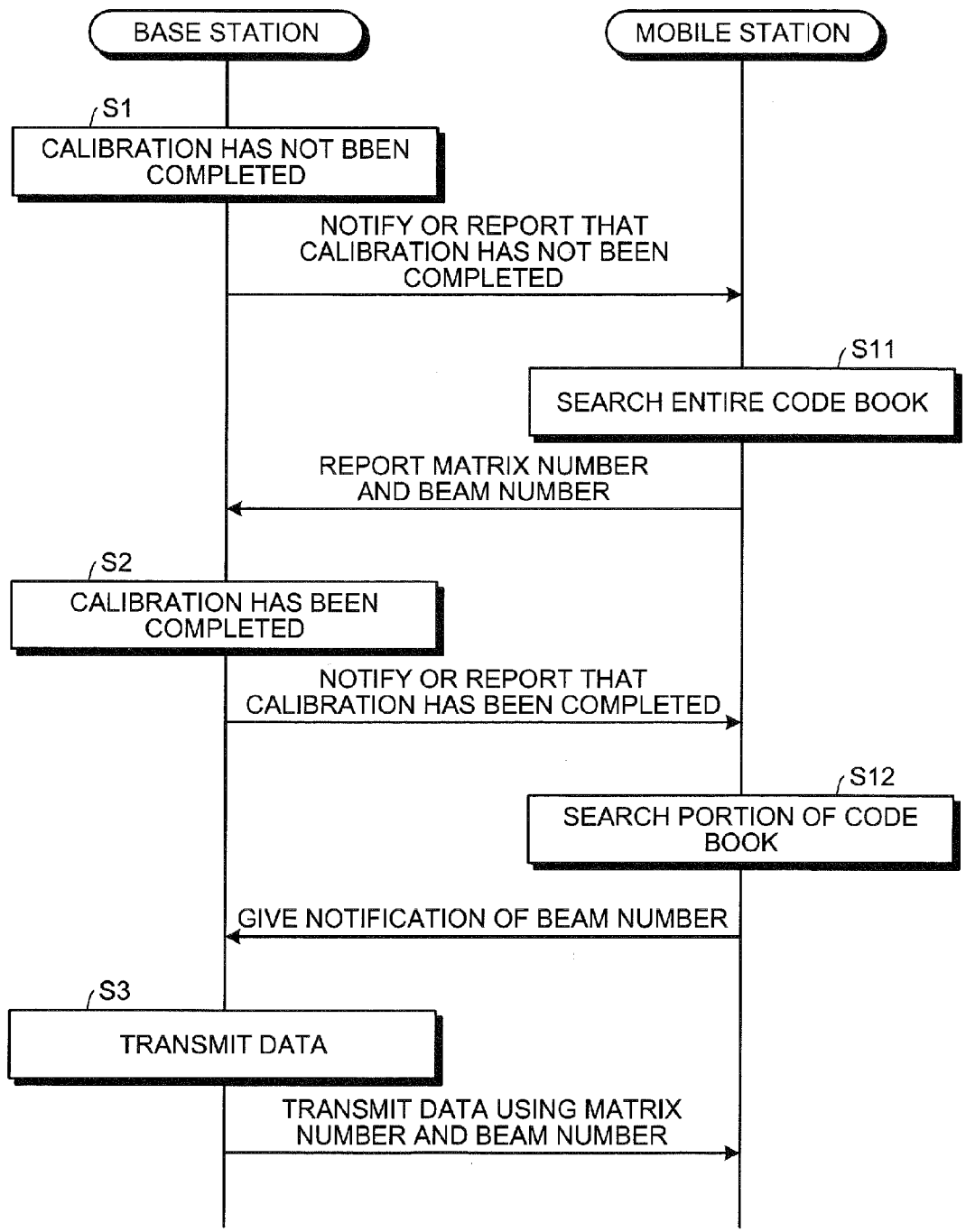
FIG. 3 is a sequence chart of processing for correcting variations in phase.

FIG. 3 is a sequence chart of processing for correcting variations in phase. FIG. 3 depicts the processes of the wireless communication apparatuses of the base station and of the mobile station.

Figure 4:
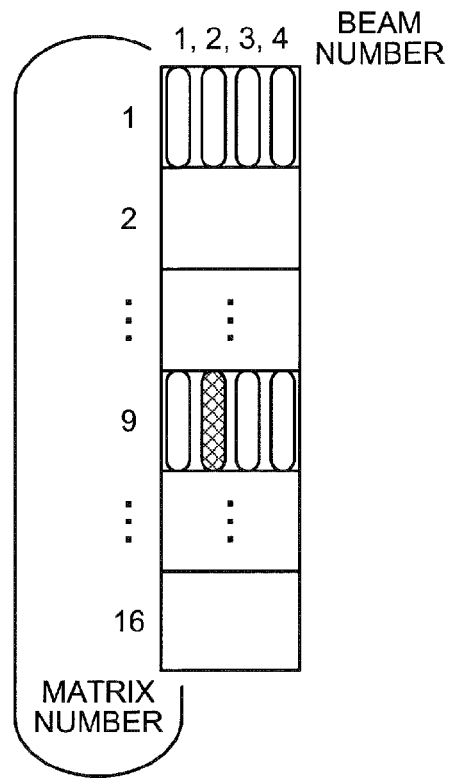
FIG. 4 is a diagram of a state during the search of the entire code book.

When calibration to correct variations in phase has not been completed (step S1), the base station notifies the mobile station or reports to the mobile station that the calibration has not been completed. In response, the mobile station searches the entire code book 61 (step S11). FIG. 4 is a diagram of a state during the search of the entire code book. The entire code book having the above 16 combinations is searched. The matrix numbers in the code book 61 are configured to circulate from 1 to 16 (cyclic address).

Based on the beam measurement by the beam measuring unit 62, the mobile station notifies the base station of the matrix number and the beam number that are the search results for the correction of variations in phase, as feedback information. In the example of FIG. 4, it is assumed that a matrix number "9" and a beam number "2" are reported as the feedback information.

The base station completes the calibration based on the feedback information (step S2). Here, the matrix number and the beam number that the feedback information indicates are read from the code book 21 and are output to the pre-coder 11 and thereby, an optimal beam is formed. The base station notifies the mobile station or reports to the mobile station that the calibration has been completed.

After the calibration has been completed in this manner, the mobile station searches a portion of the code book (step S12).

Figure 5:
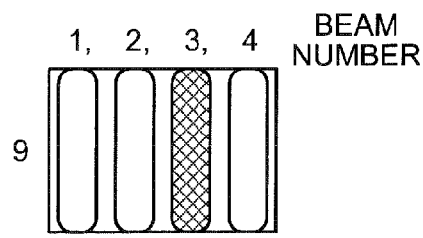
FIG. 5 is a diagram of a state during the search of a portion of the code book.

FIG. 5 is a diagram of a state during the search of a portion of the code book. This search of a portion is a search for the beam number in the matrix number 9 obtained by the search of the entire code book. After variations in phase have been corrected, search of the entire code book is not performed and an optimal beam number with which SINR remains at its maximum is searched for. In the example of FIG. 5, the base station is notified of the beam number "3", as the result of the search.

Subsequently, the base station executes data transmission (step S3). Here, data transmission is executed using the matrix number and the beam number received from the mobile station. Upon completion of the above, one session of the process comes to an end.

Figure 6:
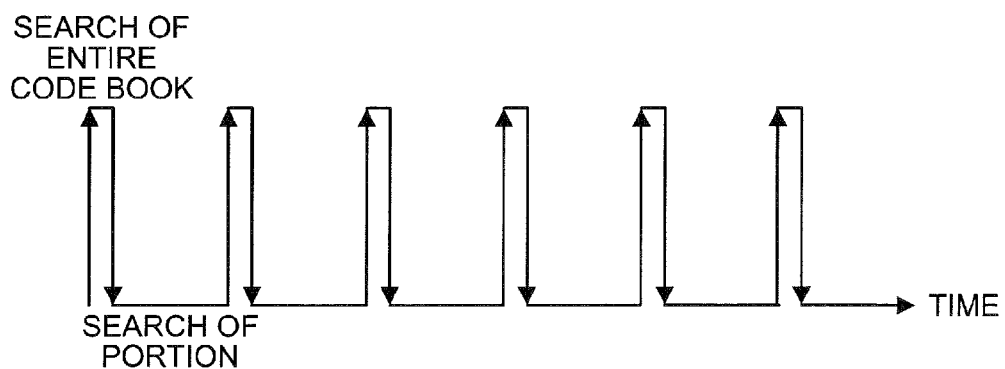
FIG. 6 is a timing chart of transitions between search states.

FIG. 6 is a timing chart of transitions between search states. After the process of searching the entire code book 61 in the mobile station (step S11) is executed, the search of the portion (step S12) is executed for a predetermined time period. As described, a search of the entire code book 61 is not performed each time the calibration process is executed and the time for the search of a portion may be increased. Thereby, the wireless communication apparatus 50 of the mobile station may easily search the code book 61, and the processing load for the search may be reduced.

The first embodiment is configured to correct, using the base station, variations in phase occurring in the transmitting circuits 13a to 13d of the transmitting unit 13 provided for the wireless communication apparatus 10 of the base station, based on the feedback information output using the state of the communication received by the wireless communication apparatus 50 of the mobile station. The correction of variations in phase does not need any special calibrating circuit and is easily executed.

Figure 7:
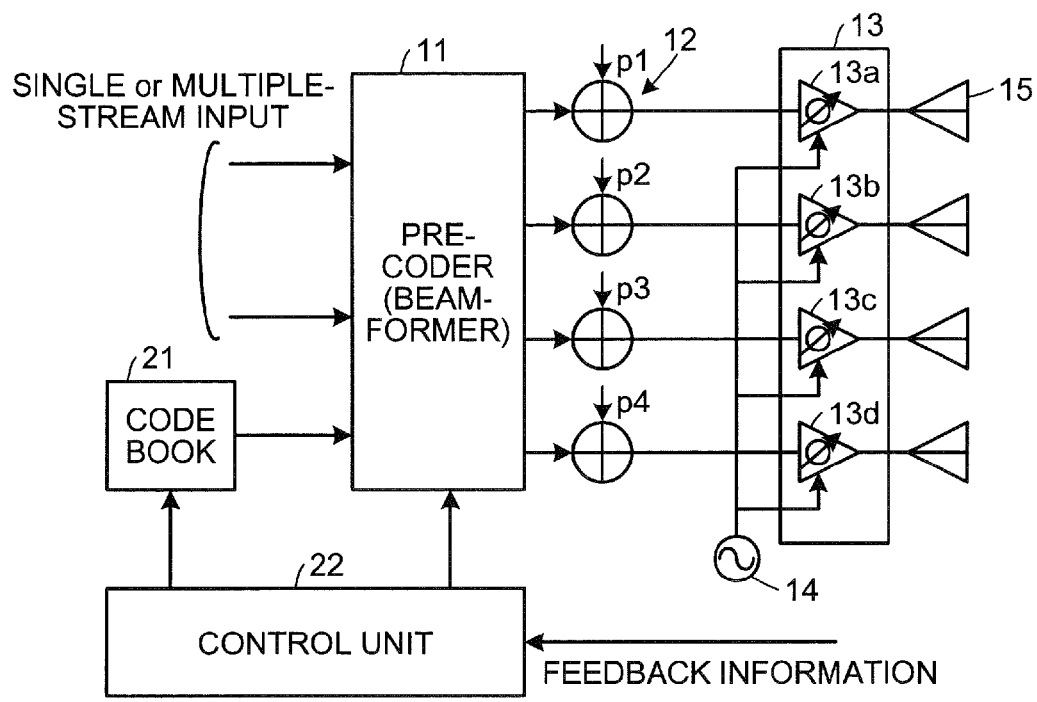
FIG. 7 is a diagram of a configuration of a wireless communication apparatus according to a second embodiment.

FIG. 7 is a diagram of a configuration of a wireless communication apparatus according to a second embodiment. The configuration differs from that of FIG. 1 described in the first embodiment in that a single oscillator is included instead of the multiple oscillators 14a to 14d and supplies a signal for multiple systems to the transmitting unit 13. The oscillator 14 supplies a common local signal to the transmitting circuits 13a to 13d of the transmitting unit 13. Thereby, no phase shift occurs for any of the transmitting circuits 13a to 13d.

Figure 8:
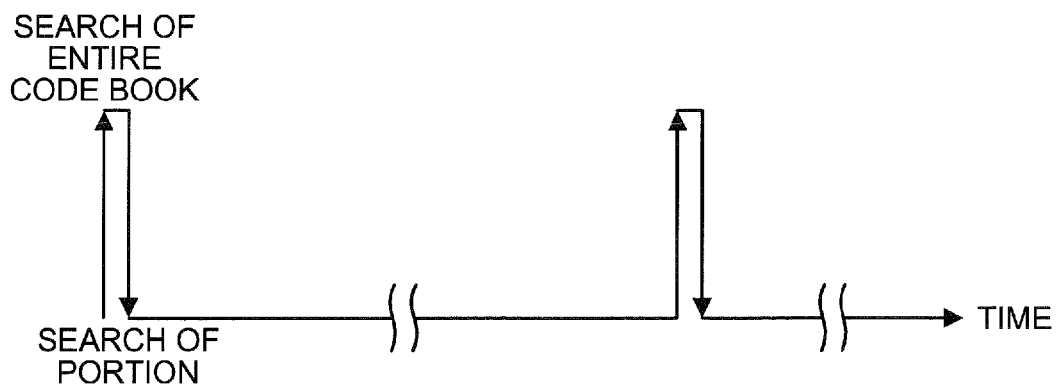
FIG. 8 is a timing chart of transitions of search states.

FIG. 8 is a timing chart of transitions of search states. In the second embodiment, the wireless communication apparatus 50 of the mobile station also executes the same processes as those depicted in FIG. 3. The processes are also identical in that, after a search of the entire code book 61 in the mobile station (step S11) is executed, the search of a portion (step S12) is executed.

In the second embodiment, the oscillator 14 is configured to supply the common local signal to the transmitting unit 13 and no variation in phase is occurs among the systems. Therefore, the entire code book 61 is searched once when the calibration process is executed once. After the search of the entire code book 61 is executed once, the time period for the search of the portion may be increased compared to that of the first embodiment (the relative length of the time period for the search of the portion may be increased). The search of the entire code book 61 may be executed at predetermined time period based on the temperature variation (a long period such as, for example, 30 minutes is set), and the variations in phase occurring in the transmitting unit 13 may be corrected at predetermined time periods, based on the temperature variation. For example, the wireless communication apparatus 50 of the mobile station may also recognize through transmission of information, etc. from the base station that the transmitting unit 13 of the wireless communication apparatus 10 of the base station is configured to use the common local signal.

The second embodiment is configured to supply the common local signal from the single oscillator 14 to the transmitting circuits 13a to 13d of the transmitting unit 13 provided for the wireless communication apparatus 10 of the base station and to correct the variations in phase using the base station based on the feedback information output using the state of the communication received by the wireless communication apparatus 50 of the mobile station. No special calibration circuit is used for the correction of the variations in phase and the correction is executed easily. Further, by using a common local signal, the cycle of the search of the entire code book may be extended and the relative length of execution of the search of the portion may be increased. Therefore, a simpler configuration is realized and the processing load on the wireless communication apparatus 50 of the mobile station is reduced.

Figure 9:
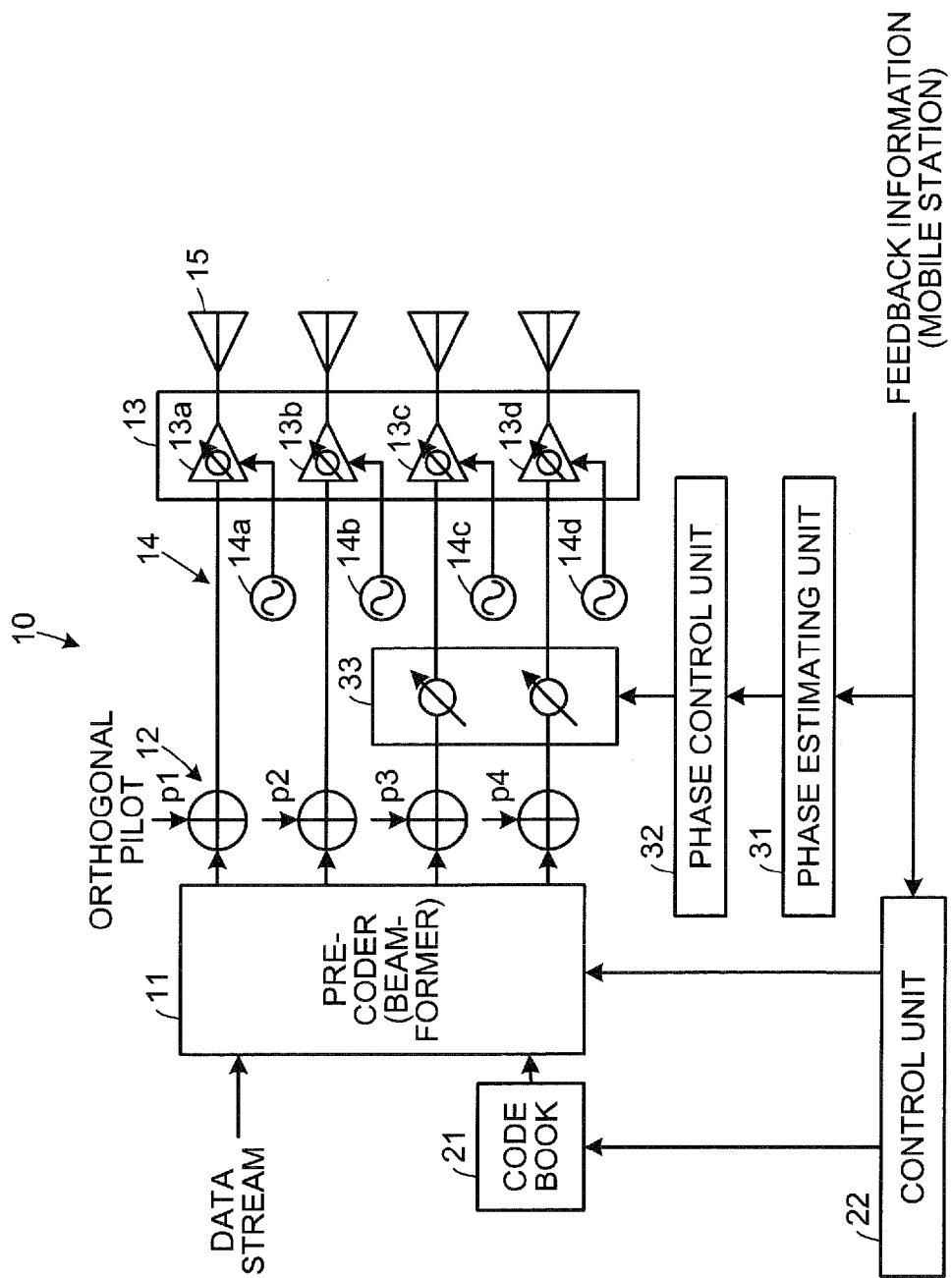
FIG. 9 is a diagram of a configuration of a wireless communication apparatus according to a third embodiment.

FIG. 9 is a diagram of a configuration of a wireless communication apparatus according to a third embodiment. In FIG. 9, components similar to the components depicted in FIG. 1 are given the same reference numerals used in FIG. 9 and description therefor is omitted. As depicted in FIG. 9, in addition to the configuration of the wireless communication apparatus 10 of the base station according to the first embodiment, the wireless communication apparatus 10 of the base station according to the third embodiment includes a phase estimating unit 31, a phase control unit 32, and a calibration phase correcting unit 33.

The phase estimating unit 31 measures the distribution of the matrix numbers selected by the wireless communication apparatus 50 based on data input from the wireless communication apparatus 50 of the mobile station. For example, the phase estimating unit 31 accumulates a given number of data of the feedback information transmitted from the wireless communication apparatus 50 of the mobile station and measures the distribution of the matrix numbers (matrix selection distribution) included in each datum of feedback information.

The phase control unit 32 controls the calibration phase correcting unit 33 such that the center of the matrix selection distribution measured by the phase estimating unit 31 coincides with the position of the fundamental matrix (the matrix number "1", a given matrix number). A fundamental matrix is a matrix that expresses a state where the relation of the phases of a multi-beam beam-formed by the pre-coder 11 is on a straight line (for example, 30°, 60°, 90° . . . ) and no correction of the phases is performed.

The calibration phase correcting unit 33 corrects the phase of the data of each system output from the pre-coder 11 to the transmitting unit 13, by controlling the phase control unit 32. When the number of systems of a multi-beam is "n", to cause the phases of the systems to be on a straight line, the phases of data of beams for at least n−2 systems of an n-system multi-beam are to be controlled. Because the number of systems in this case is four, the calibration phase correcting unit 33 corrects the phases of the data for two systems output to the two transmitting circuits 13c and 13d.

Figure 10:
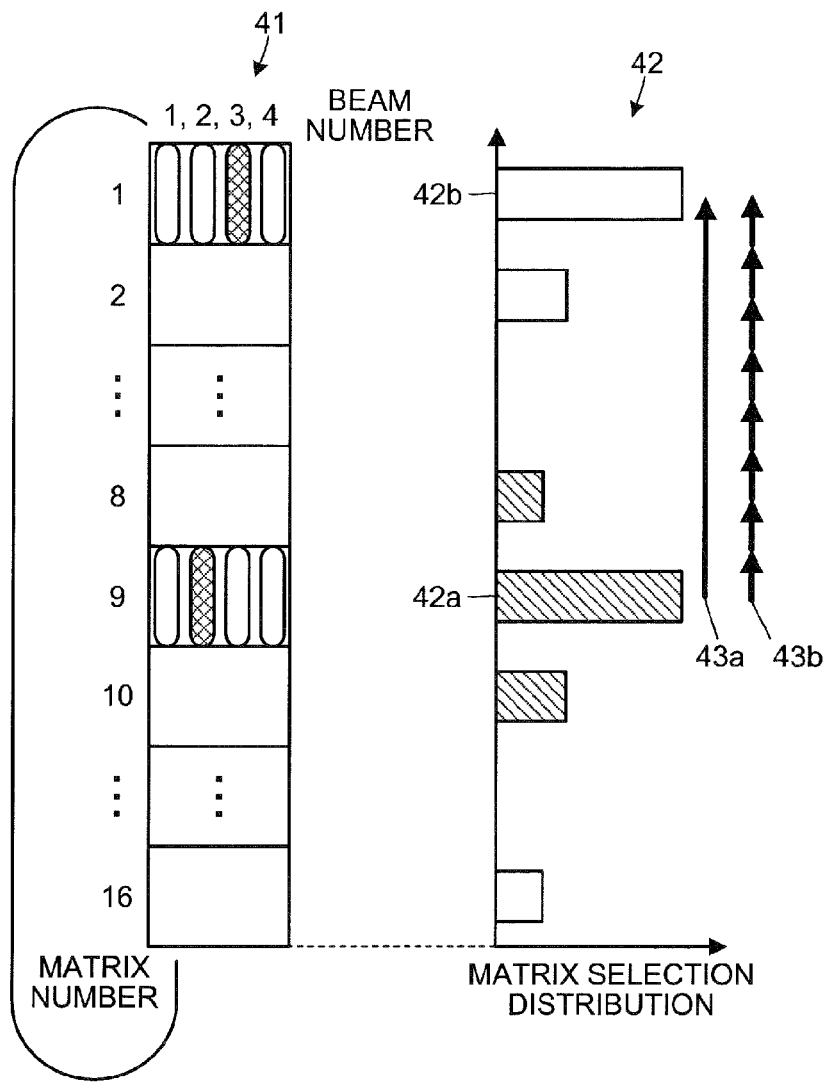
FIG. 10 is a diagram of a code book and the matrix selection distribution.

FIG. 10 is a diagram of a code book and the matrix selection distribution. Reference numeral 41 of FIG. 10 denotes a code book similar to the code book depicted in FIG. 4. Reference numeral 42 denotes the matrix selection distribution measured by the phase estimating unit 31 and the matrix numbers of this distribution correspond to the matrix numbers of the code book 41. When the center of the matrix selection distribution coincides with the position of a matrix number 9 as denoted by a reference number 42a, the phase control unit 32 controls the calibration phase correcting unit 33 such that the center of the matrix selection distribution coincides with the position of the fundamental matrix as denoted by reference numeral 42b.

In this case, the center of the matrix selection distribution may be moved at one time from the position of the matrix number 9 to the position of the fundamental matrix as denoted by reference numeral 43a or the center of the matrix selection distribution may be moved stepwise from the position of the matrix number 9 to the position of the fundamental matrix as denoted by reference numeral 43b.

Figure 11:
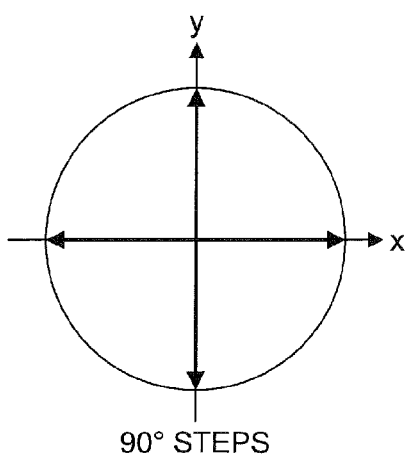
FIG. 11 is a diagram of stepwise phase correction at the pre-coder and the control unit.
Figure 12:
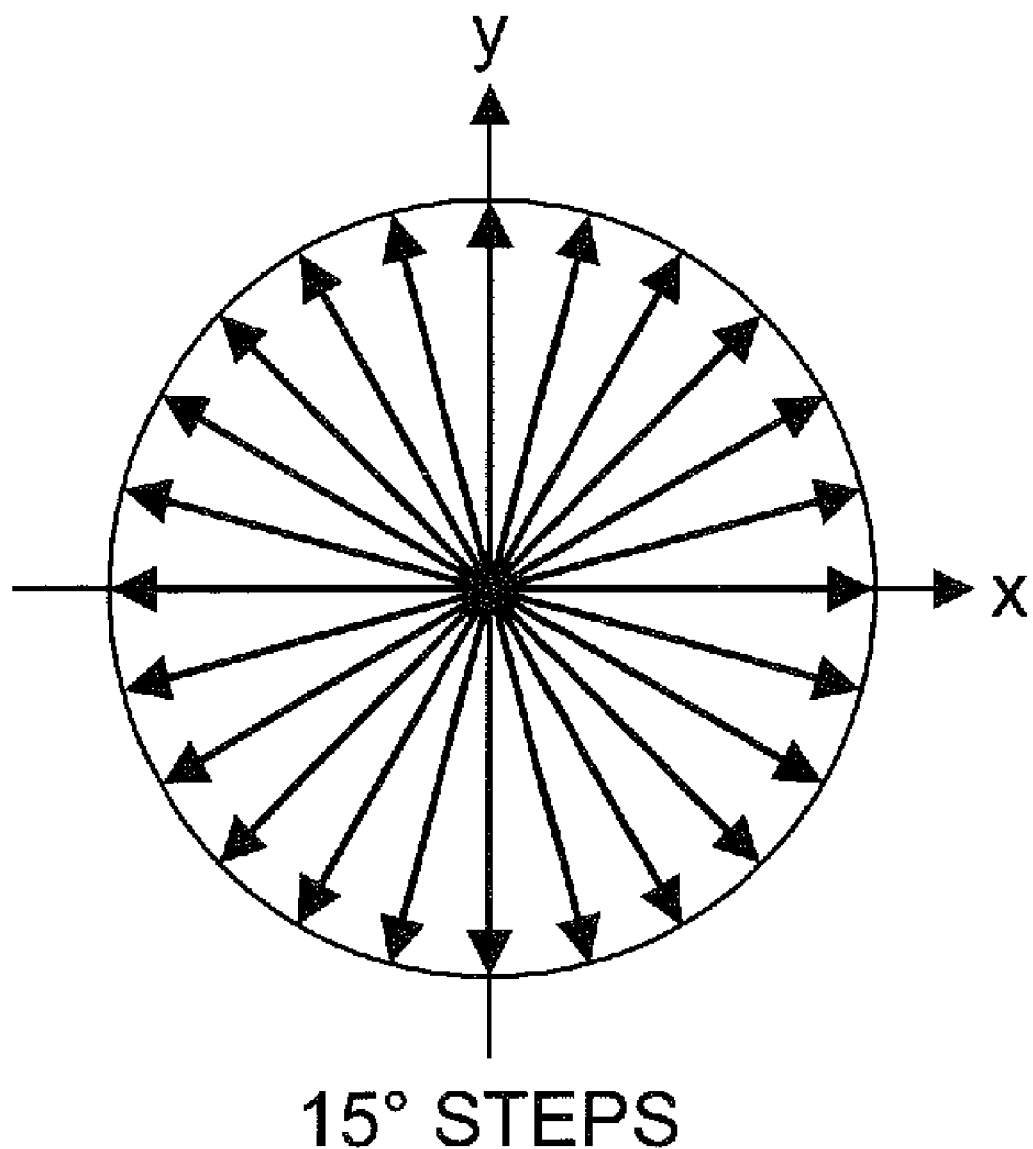
FIG. 12 is a diagram of stepwise calibration phase correction at the calibration phase correcting unit and the phase control unit.

FIG. 11 is a diagram of stepwise phase correction at the pre-coder and the control unit. FIG. 12 is a diagram of stepwise calibration phase correction at the calibration phase correcting unit and the phase control unit. As depicted in FIG. 11, the pre-coder 11 and the control unit 22 correct the phase of the data, for example, by 90° steps.

Whereas, the calibration phase correcting unit 33 and the phase control unit 32 execute the calibration phase correction using smaller phase units than those for the phase correction by the pre-coder 11 and the control unit 22. For example, as depicted in FIG. 12, the calibration phase correcting unit 33 and the phase control unit 32 execute the calibration phase correction by 15° steps.

Figure 13:
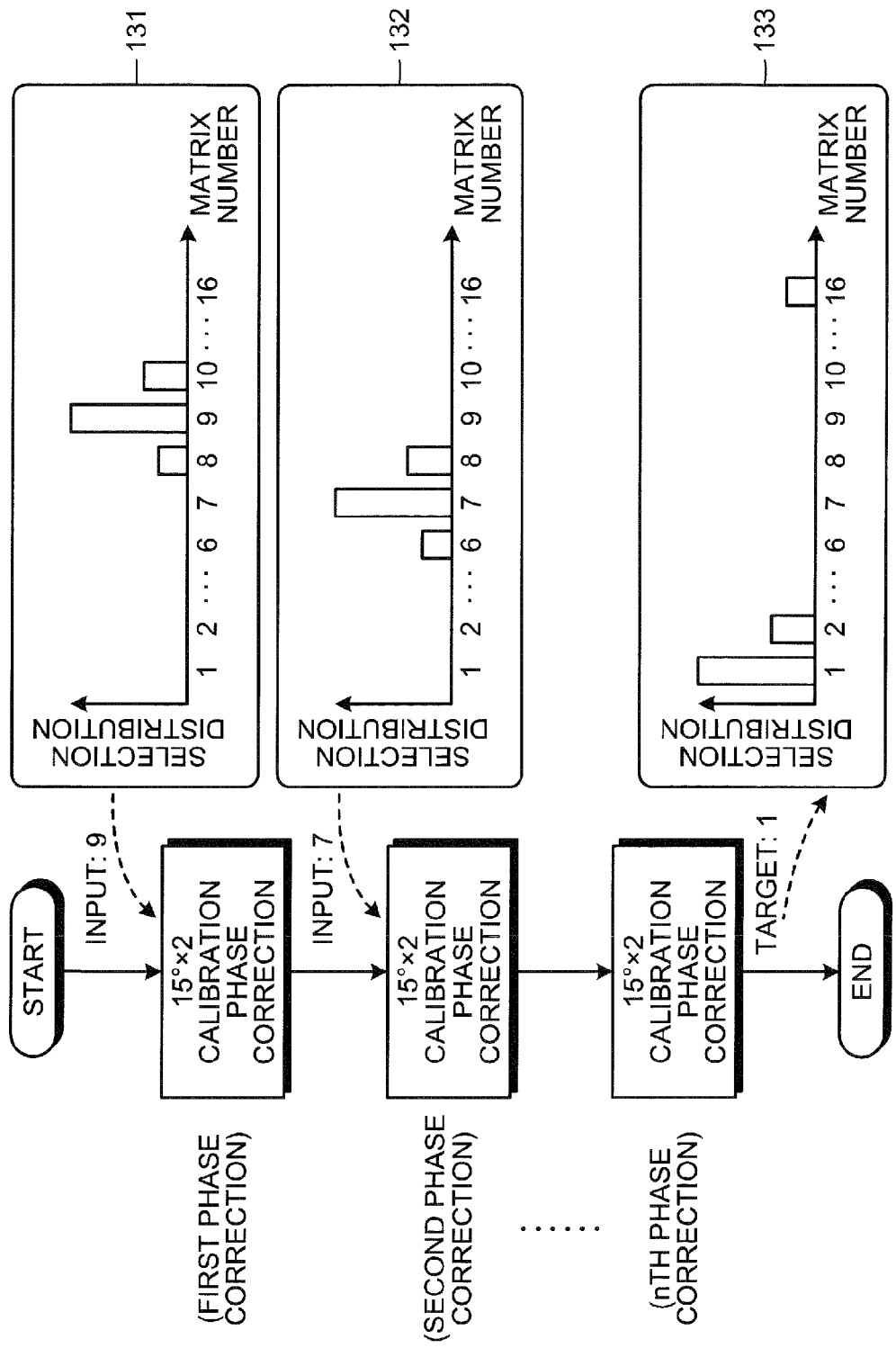
FIG. 13 is a flowchart of the stepwise calibration phase correction by the phase control unit.

FIG. 13 is a flowchart of the stepwise calibration phase correction by the phase control unit. With reference to FIG. 13, an example where the calibration phase correcting unit 33 and the phase control unit 32 execute the calibration phase correction by two steps at one time, at 15° per step will be described. It is assumed that the center of the matrix selection distribution first coincides with the position of the matrix number 9 (input: 9) as denoted by reference numeral 131.

The calibration phase correcting unit 33 and the phase control unit 32 execute a first session of calibration phase correction. It is assumed that, with this correction, the center of the matrix selection distribution coincides with the position of a matrix number 7 as denoted by reference numeral 132 (input: 7). The calibration phase correcting unit 33 and the phase control unit 32 then execute a second session of calibration phase correction.

In this manner, the calibration phase correcting unit 33 and the phase control unit 32 execute stepwise calibration phase correction for n times until the center of the matrix selection distribution coincides with the position of a matrix number 1 (the fundamental matrix, target: 1) as denoted by reference numeral 133. Thereby, the precision of the calibration by the calibration phase correcting unit 33 and the phase control unit 32 may be improved.

Figure 14:
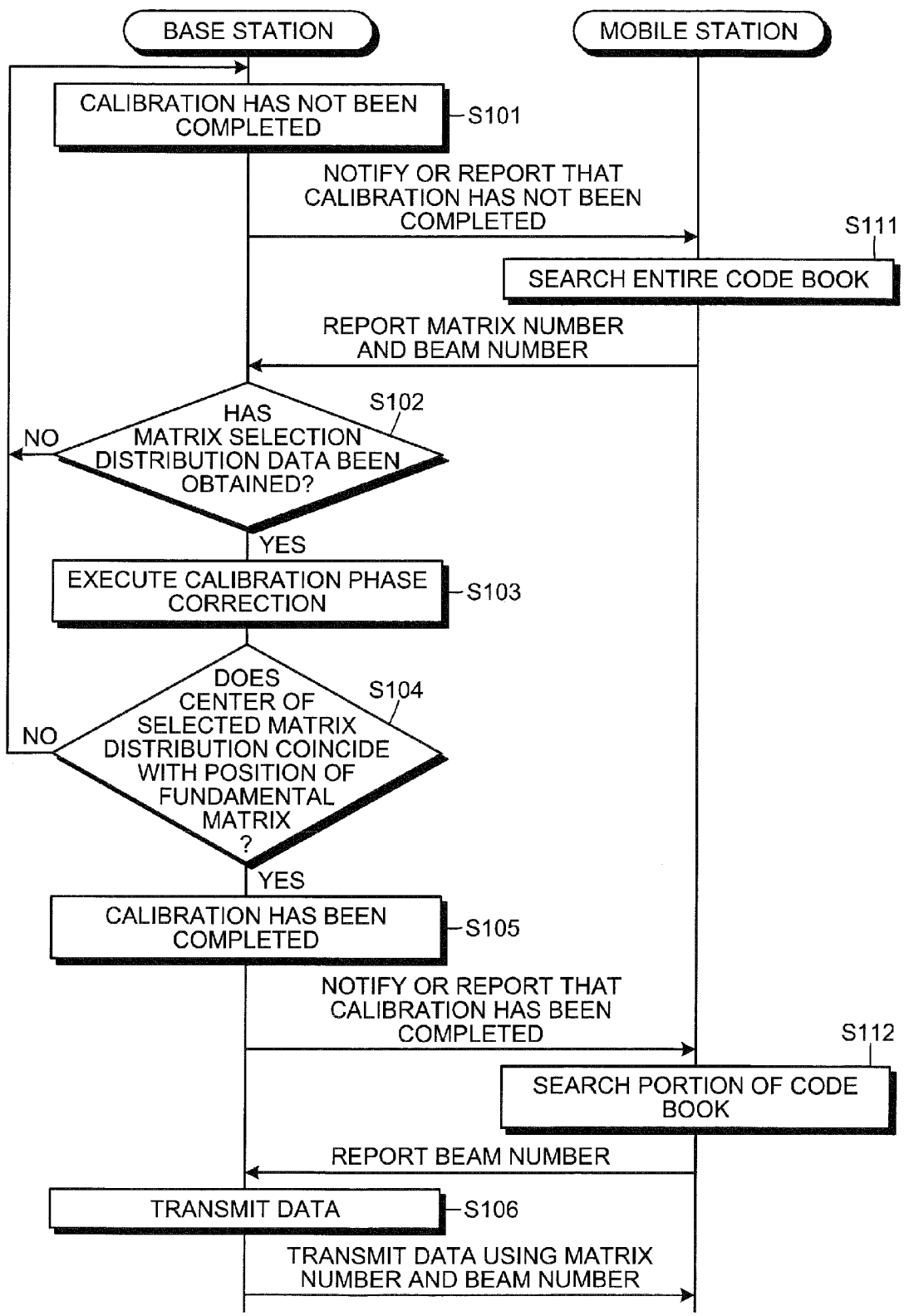
FIG. 14 is a sequence chart of processes concerning the correction of variations in phase and the calibration phase correction.

FIG. 14 is a sequence chart of processes concerning the correction of variations in phase and the calibration phase correction. FIG. 14 depicts processes by the wireless communication apparatuses of the base station and of the mobile station.

When the calibration to correct variations in phase has not been completed (step S101), the base station notifies the mobile station or reports to the mobile station that the calibration has not been completed. In response, the mobile station searches the entire code book (step S111). For example, the mobile station searches the entire code book 41 which includes the 16 combinations depicted in FIG. 10.

Based on the beam measurement by the beam measuring unit 62, the mobile station reports, as the feedback information, the matrix number and the beam number that are the result of the search executed to correct variations in phase. In the example depicted in FIG. 10, it is assumed that the matrix number 9 and a beam number 2 are reported.

The base station determines whether the data on the matrix selection distribution has been obtained (step S102). For example, the base station determines whether a given number of data of feedback information have been accumulated. If the acquisition of the data on the matrix selection distribution has not been completed (step S102: NO), flow returns to step S101 and processing is continued.

If the acquisition of the data on the matrix selection distribution has been completed at step S102 (step S102: YES), the base station executes the calibration phase correction using the phase control unit 32 and the calibration phase correcting unit 33 (step S103), and determines whether the center of the matrix selection distribution coincides with the position of the fundamental matrix (step S104).

If the center of the matrix selection distribution does not coincide with the position of the fundamental matrix at step S104 (step S104: NO), flow returns to step S101 and processing is continued. If the center of the matrix selection distribution coincides with the position of the fundamental matrix (step S104: YES), the calibration comes to an end (step S105). The base station notifies the mobile station or reports to the mobile station that the calibration has been completed.

After the calibration has been completed in this manner, the mobile station searches a portion of the code book (step S112). In the third embodiment, because the calibration phase correction is executed by the base station such that the center of the matrix selection distribution coincides with the position of the fundamental matrix, the mobile station merely searches for the beam number in the fundamental matrix. In the example depicted in FIG. 10, the beam number "3" is reported to the base station, as the result of the search.

Subsequently, the base station executes data transmission (step S106). In this case, the data transmission is executed using the fundamental matrix and the beam number that is reported by the mobile station; thereby, one session of the processes comes to an end.

Figure 15:
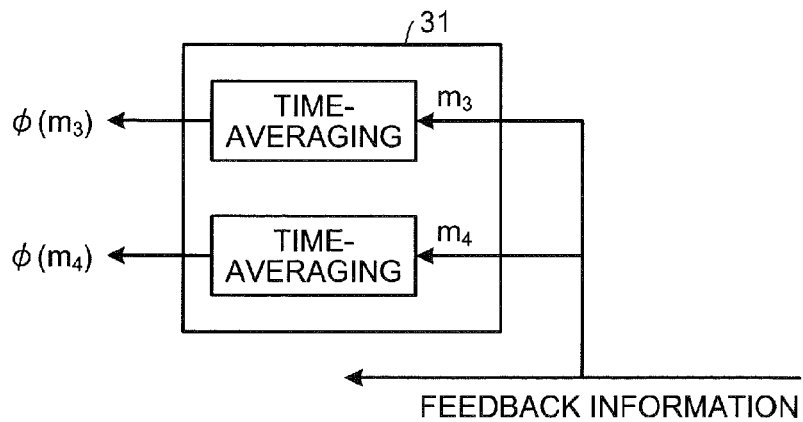
FIG. 15 is a diagram of a first measurement example of the matrix selection distribution by the phase estimating unit.

FIG. 15 is a diagram of a first measurement example of the matrix selection distribution by the phase estimating unit. The phase estimating unit 31 measures the matrix selection distribution by, for example, accumulating multiple data of feedback information transmitted from the wireless communication apparatus 50 of the mobile station, and calculating the average values $\phi(m_3)$ and $\phi(m_4)$ obtained by respectively time-averaging the phase numbers (matrix numbers) $m_3$ and $m_4$ included in the feedback information.

Figure 16:
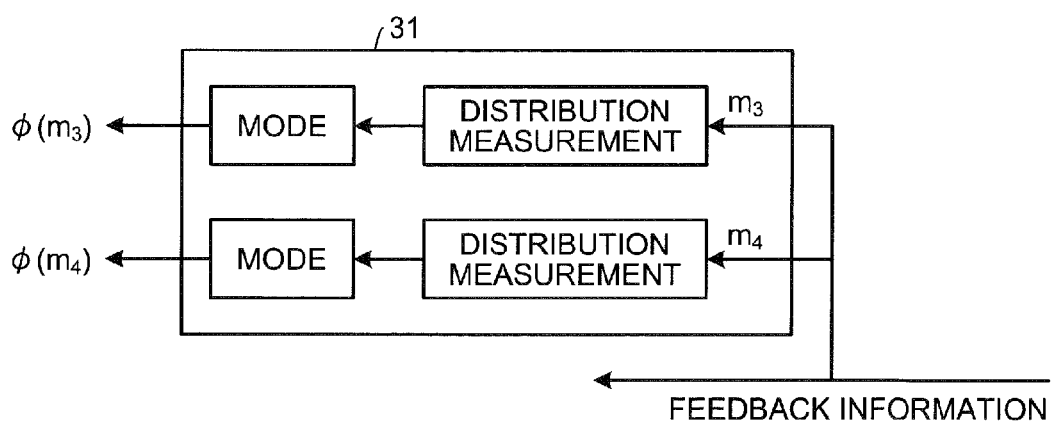
FIG. 16 is a diagram of a second measurement example of the matrix selection distribution by the phase estimating unit.

FIG. 16 is a diagram of a second measurement example of the matrix selection distribution by the phase estimating unit. The phase estimating unit 31 may also measure the matrix selection distribution by obtaining the distribution of each of the phase numbers $m_3$ and $m_4$ included in the multiple data of feedback information obtained from the wireless communication apparatus 50 of the mobile station, and calculating modes $\phi(m_3)$ and $\phi(m_4)$ respectively of the phase numbers $m_3$ and $m_4$.

Figure 17:
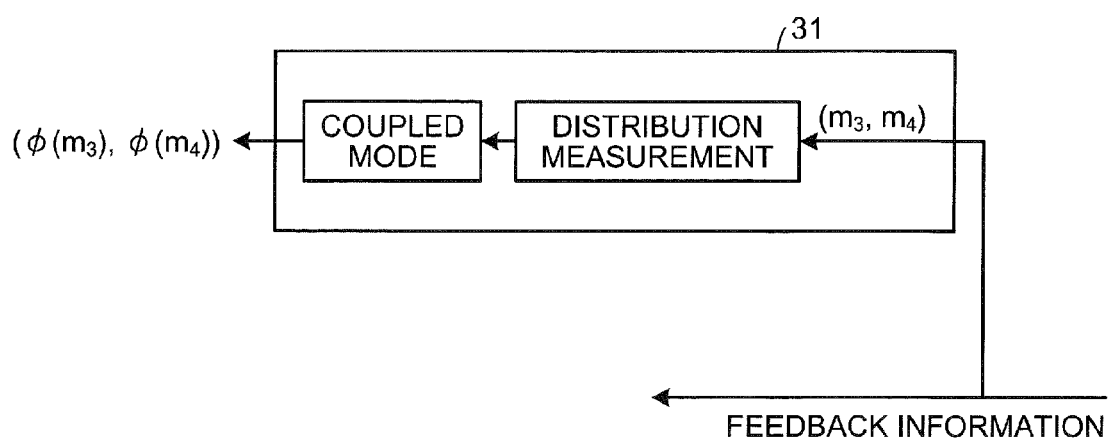
FIG. 17 is a diagram of a third measurement example of the matrix selection distribution by the phase estimating unit.

FIG. 17 is a diagram of a third measurement example of the matrix selection distribution by the phase estimating unit. The phase estimating unit 31 may also measure the matrix selection distribution by obtaining a coupled distribution of the phase numbers $m_3$ and $m_4$ included in the multiple data of feedback information obtained from the wireless communication apparatus 50 of the mobile station, and calculating a coupled mode ($\phi(m_3)$, $\phi(m_4)$) of the phase numbers $m_3$ and $m_4$.

According to the configuration of the third embodiment, the effect of the configuration of the first embodiment is achieved and by executing the calibration phase correction such that the center of the matrix selection distribution coincides with the position of the fundamental matrix, the amount of calculation thereafter for the channel estimation value HW of each beam in the wireless communication apparatus 50 of the mobile station and the amount of information of the feedback information transmitted from the wireless communication apparatus 50 of the mobile station to the wireless communication apparatus 10 of the base station may be reduced.

The configuration of the third embodiment has been described based on the configuration of the first embodiment. However, the phase estimating unit 31, the phase control unit 32, and the calibration phase correcting unit 33 may be altered to a configuration that is applicable to the configuration of the second embodiment.

Figure 18:
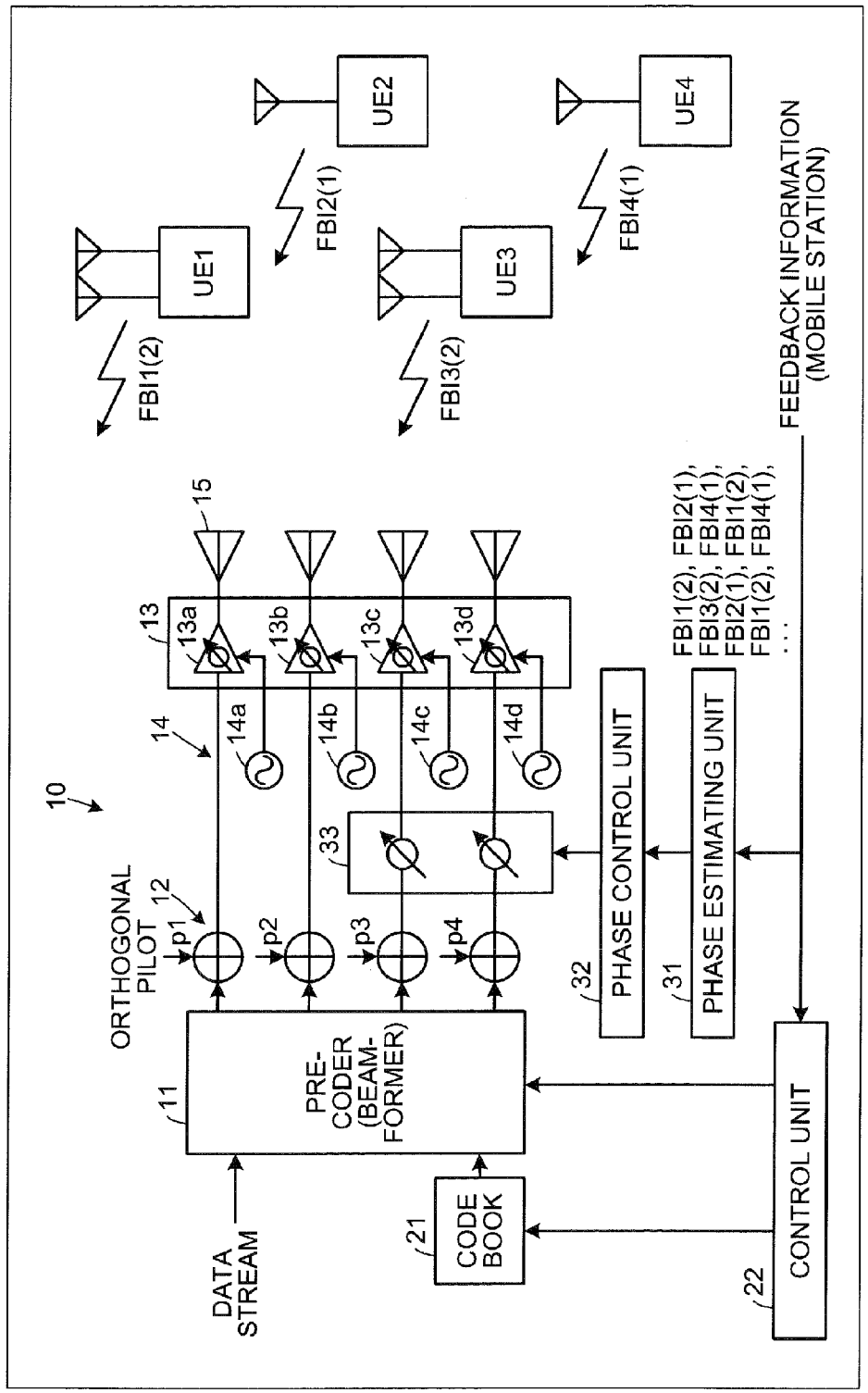
FIG. 18 is a diagram of a configuration of a wireless communication apparatus according to a fourth embodiment.

FIG. 18 is a diagram of a configuration of a wireless communication apparatus according to a fourth embodiment. In FIG. 18, components similar to the components depicted in FIG. 1 are given the same reference numerals used in FIG. 9 and description therefor is omitted. As depicted in FIG. 18, the wireless communication apparatus 10 according to the fourth embodiment executes multi-user communication with wireless communication apparatuses UE1 to UE4 of multiple mobile stations. Each of the wireless communication apparatuses UE1 to UE4 has a configuration identical to that of the wireless communication apparatus 50 of the above mobile station.

Each of the wireless communication apparatuses UE1 to UE4 transmits FBIx(n) as feedback information to the wireless communication apparatus 10 of the base station. In this example, in FBIx(n), "x" represents the number of a wireless communication apparatus of a mobile station and "n" represents the number of streams of the wireless communication apparatus of the mobile station. For example, the number of streams of each of the wireless communication apparatuses UE1 and UE3 is "2". The number of streams of each of the wireless communication apparatuses UE2 and UE4 is "1".

Figure 19:
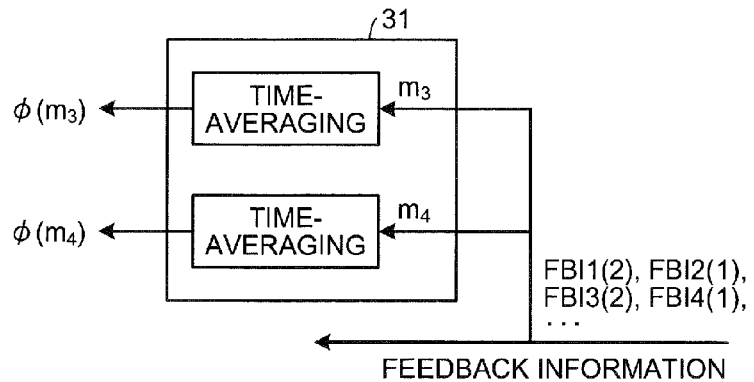
FIG. 19 is a diagram of a first measurement example of the matrix selection distribution by the phase estimating unit.

FIG. 19 is a diagram of a first measurement example of the matrix selection distribution by the phase estimating unit. The phase estimating unit 31 measures the matrix selection distribution by, for example, obtaining data of feedback information FBI1(2), FBI2(1), FBI3(2), and FBI4(1) transmitted respectively from the wireless communication apparatuses UE1 to UE4 of the mobile stations, and calculating the average values $\phi(m_3)$ and $\phi(m_4)$ obtained by respectively time-averaging the phase numbers $m_3$ and $m_4$ included in each datum of feedback information.

Figure 20:
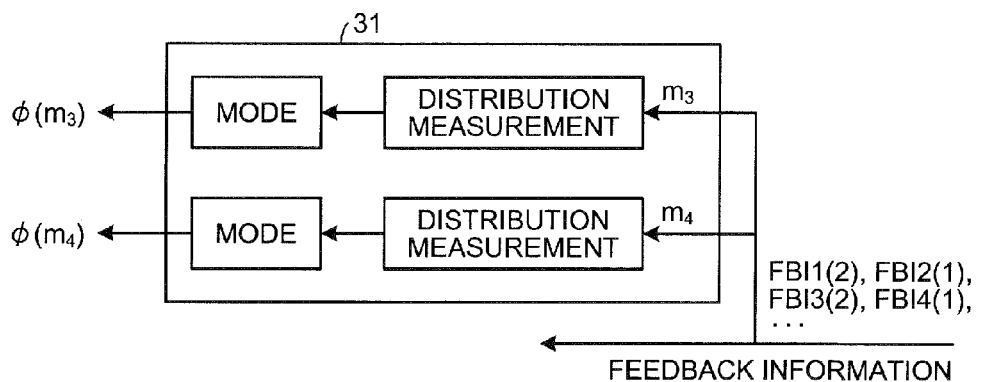
FIG. 20 is a diagram of a second measurement example of the matrix selection distribution by the phase estimating unit.

FIG. 20 is a diagram of a second measurement example of the matrix selection distribution by the phase estimating unit. The phase estimating unit 31 may also measure the matrix selection distribution by obtaining the distribution of each of the phase numbers $m_3$ and $m_4$ included in each datum of feedback information FBI1(2), FBI2(1), FBI3(2), and FBI4 (1), and calculating modes $\phi(m_3)$ and $\phi(m_4)$ respectively of $m_3$ and $m_4$.

Figure 21:
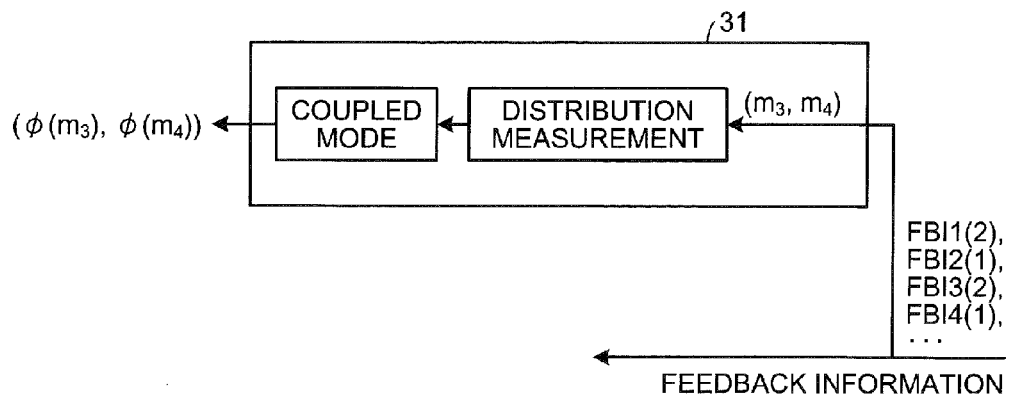
FIG. 21 is a diagram of a third measurement example of the matrix selection distribution by the phase estimating unit.

FIG. 21 is a diagram of a third measurement example of the matrix selection distribution by the phase estimating unit. The phase estimating unit 31 may also measure the matrix selection distribution by obtaining a coupled distribution of the phase numbers $m_3$ and $m_4$ included in each datum of feedback information FBI1(2), FBI2(1), FBI3(2), and FBI4(1), and calculating a coupled mode ($\phi(m_3)$, $\phi(m_4)$) of $m_3$ and $m_4$.

The phase estimating unit 31 may accumulate each datum of feedback information FBI1(2), FBI2(1), FBI3(2), and FBI4(1) transmitted respectively from the wireless communication apparatuses UE1 to UE4 of the mobile stations and based on the phase numbers $m_3$ and $m_4$ included in each datum of the feedback information, may calculate the average values φ(m3) and φ(m4), the modes φ(m3) and φ(m4), or the coupled mode (φ(m3), φ(m4)) described with reference to FIGS. 19 to 21.

Figure 22:
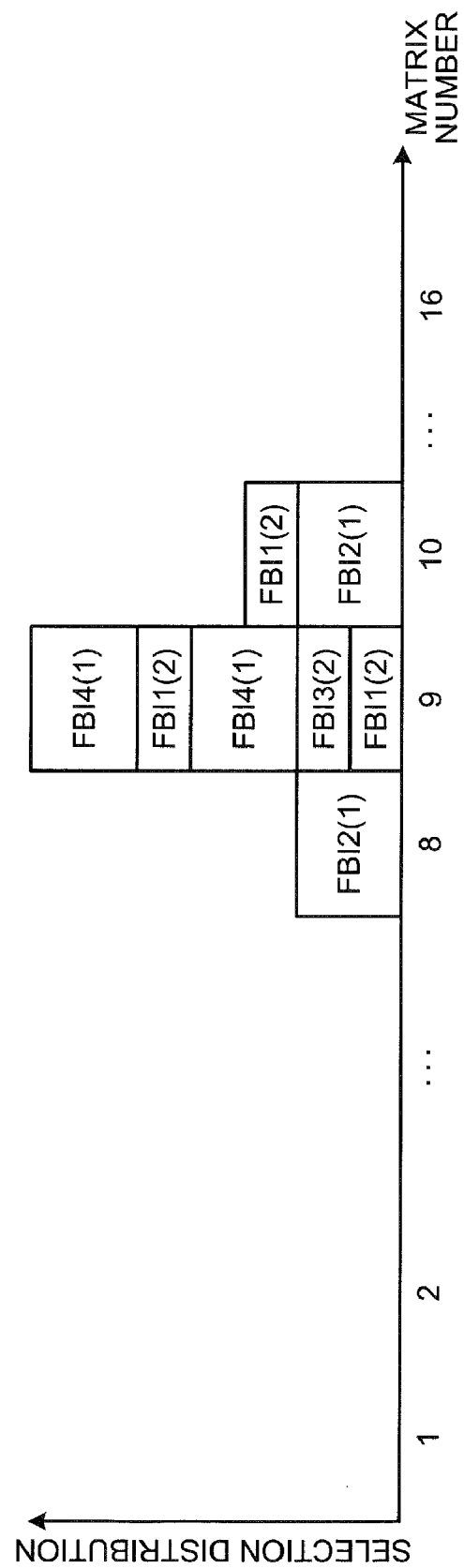
FIG. 22 is a diagram of weighting for each of the wireless communication apparatuses of the mobile stations.
Figure 23:
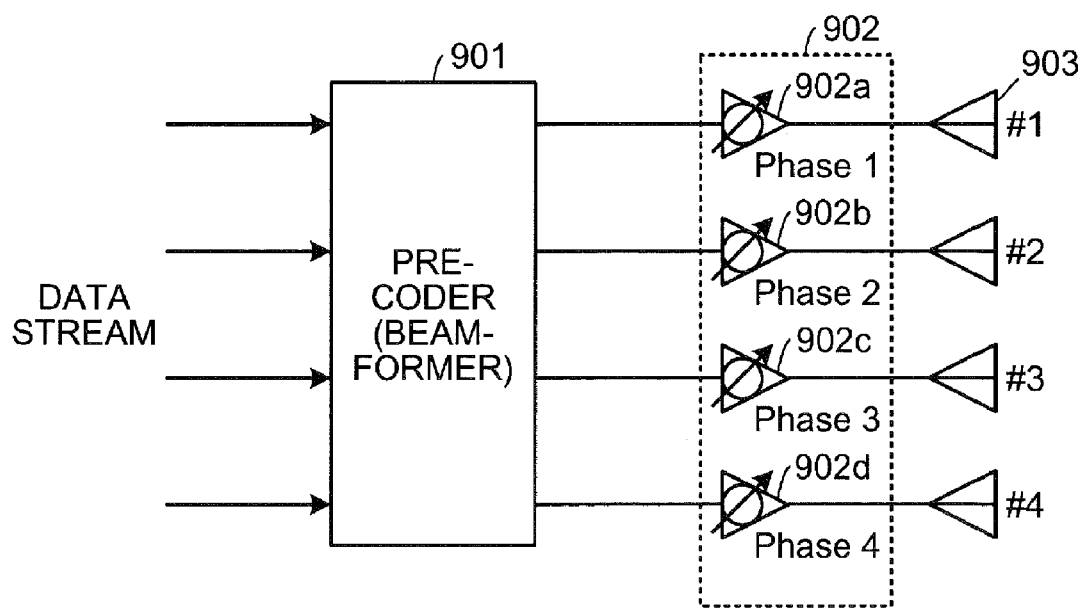
FIG. 23 is a diagram of a wireless communication apparatus that executes pre-coding MIMO.

FIG. 22 is a diagram of weighting for each of the wireless communication apparatuses of the mobile stations. When measuring the matrix selection distribution, the phase estimating unit 31 may weight the feedback information using the wireless communication apparatuses of the mobile stations. For example, the phase estimating unit 31 weights the feedback information according to the number of streams of each of the wireless communication apparatuses UE1 to UE4 that transmit the feedback information.

For example, as depicted in FIG. 22, the weight of the frequency of each of the matrix numbers included in the data of feedback information FBI2(1) and FBI4(1) transmitted from the wireless communication apparatuses UE2 and UE4, each having "1" stream, is set to be double the weight of the frequency of each of the matrix numbers included in the data of feedback information FBI1(2) and FBI3(2) transmitted from the wireless communication apparatuses UE1 and UE3 and each having "2" streams, and the matrix selection distribution is measured.

According to the above configuration of the fourth embodiment, the effect of the configuration of the third embodiment is achieved and the calibration phase correction for the wireless communication apparatuses UE2 and UE4 is executed with preference using the above weighting. Thereby, a wireless communication apparatus handling a fewer number of streams has a stronger gain effect by the beamforming compared with a wireless communication apparatus handling a larger number of streams and therefore, the efficiency of the beamforming may be improved over the entire communication system.

In the above embodiments, the configuration of input data of one user as a single stream and transmission of the data after the beamforming has been described as an example. The present embodiments are applicable to the above configuration in addition to a configuration where data of multiple users is input as a multi-stream and the data is transmitted using a multi-beam.

The wireless communication method explained in the embodiments may be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program may be distributed through a network such as the Internet.

According to the embodiments, even if variations in phase occur, by correcting the variations through a simple configuration in which the reading of a code book is controlled, desired directionality of a multi-beam is effected and improvement of gain at a mobile station is facilitated without the use of any particular calibrating apparatus or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus of a base station, using antennas for a plurality of systems, forming a multi-beam, transmitting data to a mobile station, and comprising:
    a code book configured to store therein beamforming information;
    a pre-coder that reads the code book and executes a process of forming a given beam for the data;
    a control unit that, based on feedback information to correct variations in phase occurring at transmitting circuits respectively corresponding to each of the systems, performs control such that the beamforming information to correct the variations in phase is read from the code book; and
    a phase correcting unit that corrects a phase of the multi-beam formed by the pre-coder, based on the feedback information and such that relations among the phases of the multi-beam become substantially linear.

2. The wireless communication apparatus according to claim 1, wherein
    the feedback information includes a matrix number and a beam number of the code book to correct the variations in phase,
    the control unit reads the matrix number and the beam number from the code book, and
    the phase correcting unit measures a distribution of the matrix number included in the feedback information and corrects a phase of the multi-beam such that the center of the distribution of the measured matrix number coincides with the position of a given matrix number.

3. The wireless communication apparatus according to claim 2, wherein
    the phase correcting unit moves, stepwise in given units, the center of the distribution of the measured matrix number.

4. The wireless communication apparatus according to claim 2, wherein
    the phase correcting unit measures the distribution by calculating an average value obtained by time-averaging the matrix number.

5. The wireless communication apparatus according to claim 2, wherein
    the phase correcting unit measures the distribution by calculating a mode of the matrix number.

6. The wireless communication apparatus according to claim 1, wherein
    the phase correcting unit corrects the phase by a phase unit that is smaller than the phase unit used by the control unit to correct the variations in phase.

7. The wireless communication apparatus according to claim 1, wherein
    the transmitting circuits respectively modulate the data using an oscillator specific for each of the systems.

8. The wireless communication apparatus according to claim 1, wherein
    the transmitting circuits respectively modulate the data using a common oscillator for the systems.

9. The wireless communication apparatus according to claim 1, wherein
    the phase correcting unit measures the distribution of the matrix number by weighting that corresponds to the number of streams of the mobile station that transmits the feedback information.

10. A wireless communication method of a wireless communication apparatus that is at a base station, uses antennas for a plurality of systems, forms a multi-beam, and transmits data to a mobile station, the wireless communication method comprising:
  reading a code book configured to store therein beamforming information;
  forming a given beam for the data;
  performing control, based on feedback information to correct variations in phase occurring at transmitting circuits respectively corresponding to each of the systems, such that the beamforming information to correct the variations in phase is read from the code book; and
  correcting a phase of the multi-beam formed at the forming, based on the feedback information and such that relations among the phases of the multi-beam become substantially linear.

* * * * *